May 1, 1923.

G. M. ASK 1,453,903

POWER TRANSMITTING MECHANISM

Filed July 24, 1922

INVENTOR

George M. Ask

BY John A. Naismith

ATTORNEY

Patented May 1, 1923.

1,453,903

UNITED STATES PATENT OFFICE.

GEORGE M. ASK, OF CORNING, CALIFORNIA.

POWER-TRANSMITTING MECHANISM.

Application filed July 24, 1922. Serial No. 577,126.

*To all whom it may concern:*

Be it known that I, GEORGE M. ASK, a citizen of the United States, and resident of Corning, in the county of Tehama, State of California, have invented certain new and useful Improvements in Power-Transmitting Mechanism, of which the following is a specification.

It is the object of my invention to provide a power transmitting mechanism that may be mounted upon or connected to any suitable driving shaft and connected to any suitable driven shaft at any distance from the driving shaft.

It is a further object of my invention to provide a mechanism of the character indicated that can be applied to widely spaced driving and driven shafts and wherein the power from the driving shaft is transmitted by tension strains only upon the elements connecting the spaced shafts.

It is a still further object of my invention to provide a mechanism for the purpose specified that will be simple in form, economical to manufacture, easily adapted to shafts of any spacing, and highly efficient in its practical application.

In the drawing:—

Figure 1:
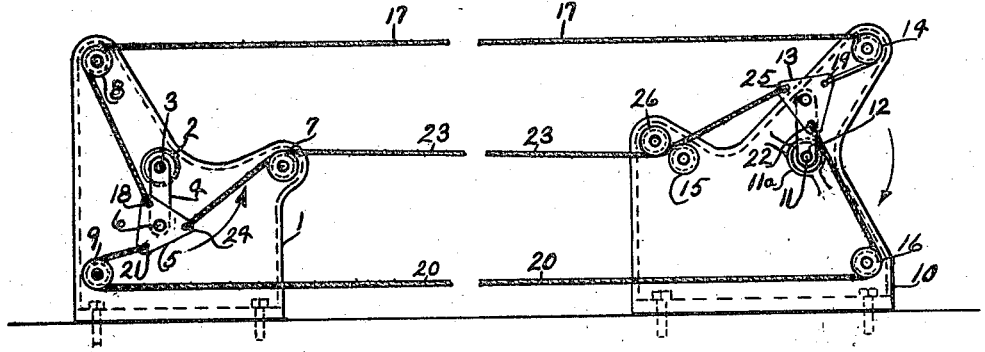
Figure 1 is a side elevation of my invention.
Figure 2:
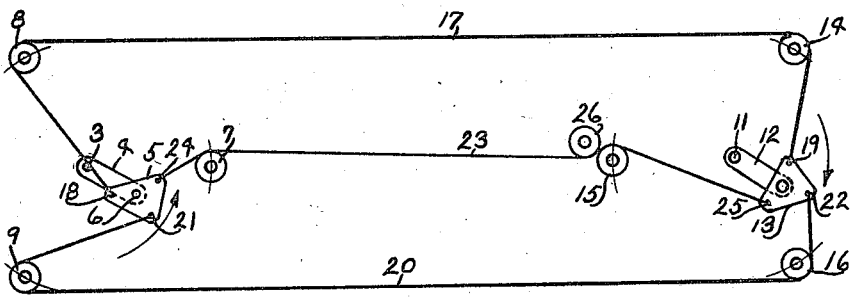
Figures 2 and 3 are diagrammatical illustrations of different positions of the working parts.
Figure 3:
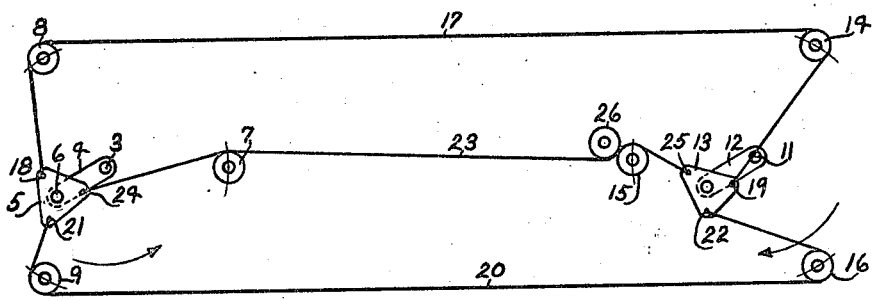
Figure 4:
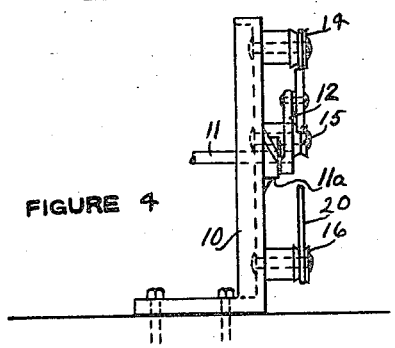
Figure 4 is an end elevation of my invention.

Referring more particularly to the drawing, I show at 1 a frame carrying bearings 2 in which is revolubly mounted a shaft 3 driven in any suitable manner as by a windmill, internal combustion engine or other power generators.

Mounted on shaft 3 to revolve therewith is an outwardly extending arm 4 having a triangular plate 5 revolubly mounted thereon as at 6.

Arranged on frame 1 and at the apices of a triangular plane lying in the plane of revolution of arm 4 and concentric therewith are three pulleys 7—8 and 9 respectively, in the present instance pulley 8 lying above a horizontal plane passing through shaft 3 and pulley 9 lying below the same.

At any desired distance from frame 1 is arranged frame 10 having shaft 11 revolubly mounted thereon in bearing 11$^a$. Shaft 11 is provided with a crank 12 having a triangular plate 13 revolubly mounted thereon, the length of crank 12 being equal to the distance between shaft 3 and pivotal point 6.

Arranged on frame 10 and at the apices of a triangular plane lying in the plane of revolution of plate 13 and concentrically therewith are three pulleys 14—15 and 16 respectively, in the present instance pulley 16 lying below a horizontal plane passing through shaft 11 and pulley 14 lying above the same.

At 17 is shown a cable connecting a point 18 on plate 5 with a point 19 on plate 13 and passing over pulleys 8 and 14.

At 20 is a cable conecting point 21 on plate 5 with point 22 on plate 13 and passing over pulleys 9 and 16. At 23 is a third cable connecting point 24 on plate 5 with point 25 on plate 13 and passing over pulleys 7 and 15, a pulley 26 being mounted on frame 10 adjacent pulley 15 for the purpose hereinafter set forth.

The points 18—21—24 on plate 5 and 19—22—25 on plate 13 are arranged triangular in formation a distance from the center of the plates.

In operation when shaft 3 is revolved in the direction indicated by the arrow, and at a uniform rate of speed, then shaft 11 is also revolved in the opposite direction at the same rate of speed. This is true because the cables 23—20—17 are successively placed under tension thereby exerting a pulling force upon crank 12. By arranging the cables and their connecting points in three sets the pull of one cable becomes effective the moment the pull of the preceding cable is relinquished.

Since in each revolution of plate 13 the point 25 passes above the upper surface of pulley 15 it is necessary to insert pulley 26 for the cable 23 to operate on during the passage of point 25 through the upper portion of its cycle.

It may now be seen that I have provided a mechanism for the purpose set forth that is economical to manufacture, smooth in action, simple in construction, highly efficient in its practical application. Also that the driven shaft 11 may be placed at any distance from shaft 3 by merely lengthening cables 17—20—23.

It is to be understood that while I have herein shown and described one specific embodiment of my invention, changes in form, construction and method of operation may be made within the scope of the appended claims.

I claim:—

1. A mechanism of the character indicated, comprising a plate mounted to revolve upon its own center and to revolve as a whole about a given center, supports lying in a circle concentric with said given center, cables engaging said supports and attached at equally spaced points to said plate, a second plate operatively mounted to revolve on its own center and to revolve as a whole about a given center, supports lying in a circle concentric with said last named given center, the said cables engaging said last named supports and attached at equally spaced points to said last named plate.

2. A mechanism of the character indicated, comprising a plate operatively mounted to revolve upon its own center and to revolve as a whole about a given center, supports arranged at the apices of a triangle concentric with said given center, cables engaging said supports and attached at equally spaced points to said plate, a second plate operatively mounted to revolve on its own center and to revolve as a whole about a given center, supports arranged at the apices of a triangle concentric with said given center, the said cables engaging said last named support and attached at equally spaced points to said last named plate.

GEO. M. ASK.